US011906543B2

(12) United States Patent
Khan

(10) Patent No.: US 11,906,543 B2
(45) Date of Patent: Feb. 20, 2024

(54) PITOT HEATER HEALTH MONITORING SYSTEM

(71) Applicant: Rosemount Aerospace Inc., Burnsville, MN (US)

(72) Inventor: Shoyeb Khan, Karnataka (IN)

(73) Assignee: ROSEMOUNT AEROSPACE INC., Burnsville, MN (US)

(*) Notice: Subject to any disclaimer, the term of this patent is extended or adjusted under 35 U.S.C. 154(b) by 0 days.

(21) Appl. No.: 17/965,849

(22) Filed: Oct. 14, 2022

(65) Prior Publication Data

US 2023/0131775 A1    Apr. 27, 2023

Related U.S. Application Data

(62) Division of application No. 16/512,816, filed on Jul. 16, 2019.

(30) Foreign Application Priority Data

May 17, 2019    (IN) .............................. 201911019523

(51) Int. Cl.
*G01P 21/02*    (2006.01)
*G01P 5/165*    (2006.01)
(Continued)

(52) U.S. Cl.
CPC ............ *G01P 21/025* (2013.01); *G01P 5/165* (2013.01); *G08B 21/182* (2013.01); *H05B 1/023* (2013.01)

(58) Field of Classification Search
CPC ..... G01P 21/025; G01P 5/165; G08B 21/182; H05B 1/023
(Continued)

(56) References Cited

U.S. PATENT DOCUMENTS 4,922,233 A * 5/1990 Twerdochlib ...... G05B 23/0262
                                                    73/204.25
6,414,282 B1    7/2002 Ice et al.
(Continued)

FOREIGN PATENT DOCUMENTS

CN    109683642 A    4/2019
DE    60100563 T2    6/2004
(Continued)

OTHER PUBLICATIONS

European Search Report; European Application 19210632.6; Application Filed: Nov. 21, 2019; Report dated Jun. 16, 2020; 10 pages.

*Primary Examiner* — Robert R Raevis
(74) *Attorney, Agent, or Firm* — CANTOR COLBURN LLP

(57) ABSTRACT

Provided are embodiments including a system for performing health monitoring. The system includes a measurement device configured to measure pressure of an environment, a heating element of the heater section coupled to the measurement device, a first sensing element operably coupled to a first region of the measurement device, and a second sensing element operably coupled to a second region of the measurement device. The system also includes a programmable logic that is configured to generate a status signal or flag based at least in part on conditions of the first region or the second region of the measurement device, a processing system configured to control the heating element responsive to reaching a threshold temperature, and a display configured to display a status of the first region or second region of the measurement device based at least in part on the status signal or flag.

8 Claims, 6 Drawing Sheets

(51) Int. Cl.
*G08B 21/18* (2006.01)
*H05B 1/02* (2006.01)

(58) Field of Classification Search
USPC .......................... 73/1.29, 1.34, 1.37, 204.16,
73/861.65–861.68, 865.9; 340/945, 517,
340/521, 522, 540, 584, 635, 655
See application file for complete search history.

(56) References Cited

U.S. PATENT DOCUMENTS

| | | |
|---|---|---|
| 6,718,283 B2 | 4/2004 | Lanham et al. |
| 9,046,899 B2 | 6/2015 | Shearer et al. |
| 9,939,459 B2 | 4/2018 | Dichek |
| 9,974,908 B2 | 5/2018 | Baldus et al. |
| 10,197,517 B2 | 2/2019 | Essawy et al. |
| 10,227,139 B2 | 3/2019 | Golly et al. |
| 2020/0363449 A1 | 11/2020 | Khan |

FOREIGN PATENT DOCUMENTS

| | | |
|---|---|---|
| EP | 1204012 A1 | 5/2002 |
| EP | 3038168 A1 | 6/2016 |
| EP | 3739411 A1 | 11/2020 |

\* cited by examiner

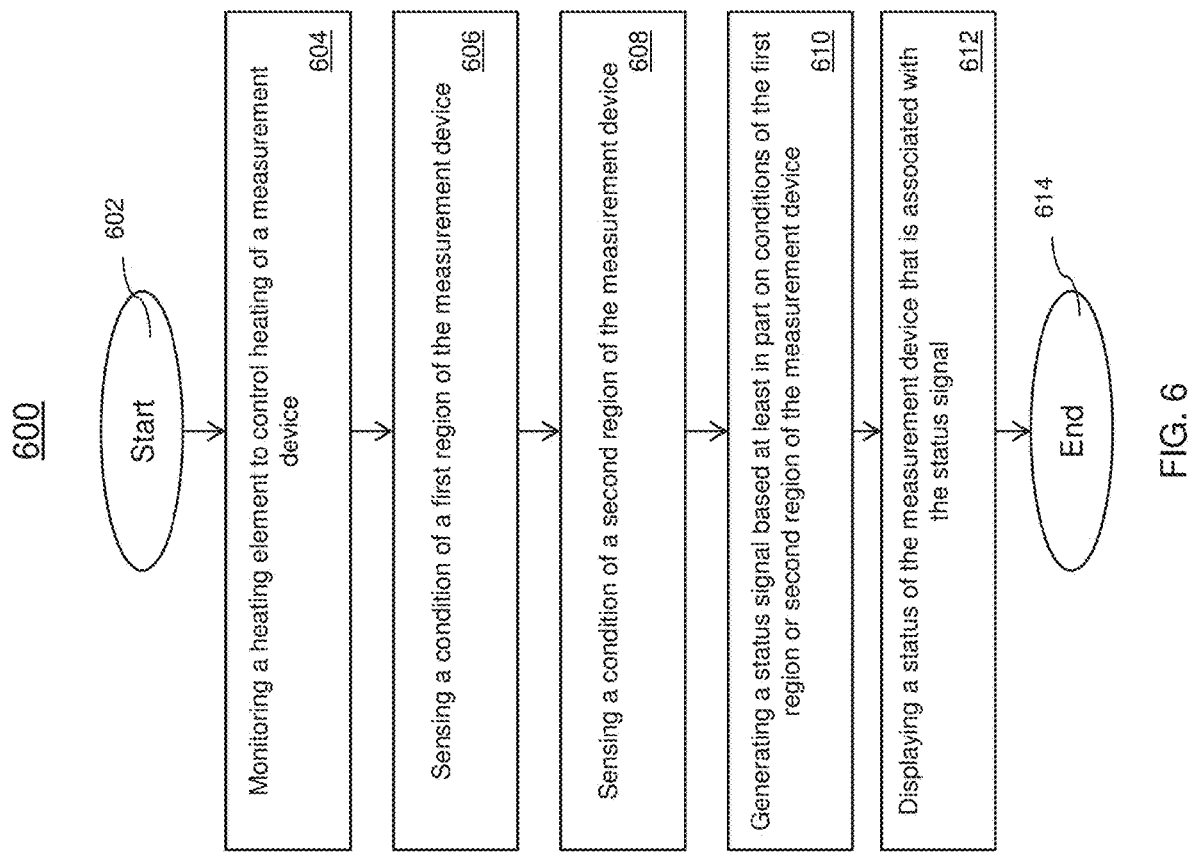

PITOT HEATER HEALTH MONITORING SYSTEM

CROSS-REFERENCE TO RELATED APPLICATIONS

This application is a division of U.S. application Ser. No. 16/512,816 filed Jul. 16, 2019, which claims the benefit of Indian Application No. 201911019523 filed May 17, 2019, which are incorporated herein by reference in their entirety.

BACKGROUND

The present disclosure relates to a health monitoring system, and more specifically to a pitot heater health monitoring system.

A pitot tube is a dynamic sensing device that can be used to measure the velocity of a flowing fluid. Pitot tubes function by measuring the dynamic pressure of the surrounding environment. It consists of a tube with a short, right-angled bend which is placed vertically in a moving fluid with the mouth of the bent part directed upstream. One application for pitot tubes includes functioning as speedometers in aircraft. The measurements collected from the pitot tubes can be used as inputs to other systems, subsystems and/or processes. Therefore, there may be a need to ensure that reliable measurements are obtained.

BRIEF DESCRIPTION

According to an embodiment, a system for performing health monitoring is provided. The system includes a measurement device configured to measure pressure of an environment, and a heating element coupled to the measurement device, wherein the heating element is configured to generate heat for the measurement device. The system also includes a first sensing element operably coupled to a first region of the measurement device, wherein the first sensing element is configured to sense a condition of the first region of the measurement device, and a second sensing element operably coupled to a second region of the measurement device, wherein the second sensing element is configured to sense a condition of the second region. The system includes a programmable logic that is configured to generate a status signal or flag based at least in part on conditions of the first region or the second region of the measurement device, a processing system configured to control the heating element responsive to reaching a threshold temperature, and a display configured to display a status of the first region or second region of the measurement device based at least in part on the status signal or flag.

In addition to one or more of the features described herein, or as an alternative, further embodiments include a first sensing element and a second sensing element that uses graphene field effect transistors based temperature sensor.

In addition to one or more of the features described herein, or as an alternative, further embodiments include a first region is a tip region of the measurement device.

In addition to one or more of the features described herein, or as an alternative, further embodiments include a second region is a heater section of the measurement device.

In addition to one or more of the features described herein, or as an alternative, further embodiments include a status signal or flag that indicates a condition of the tip region of the measurement device.

In addition to one or more of the features described herein, or as an alternative, further embodiments include a status signal or flag that indicates a condition of a heating element in the heater section of the measurement device.

In addition to one or more of the features described herein, or as an alternative, further embodiments include a programmable logic and processing system that are configured to compare a temperature of the first region with a temperature of the second region, and trigger an alarm based on the comparison of the temperature of the first region and the temperature of the second region.

In addition to one or more of the features described herein, or as an alternative, further embodiments include a programmable logic and processing system that are configured to compare the condition sensed by the first sensing element with a first threshold value.

In addition to one or more of the features described herein, or as an alternative, further embodiments include a programmable logic and processing system that are configured to compare the condition sensed by the second sensing element with a second threshold value.

According to an embodiment, a method for performing health monitoring is provided. The method includes monitoring a heating element to control heating of a measurement device, and sensing, by a first sensing element, a condition of a first region of the measurement device. The method also includes sensing, by a second sensing element, a condition of a second region of the measurement device, and generating, by a programmable logic and processing system, a status signal or flag based on conditions of the first or second region of the measurement device and hence, the degradation of the heater is detected prior to an actual failure.

In addition to one or more of the features described herein, or as an alternative, further embodiments include a first sensing element and a second sensing element that are graphene field effect transistors based temperature sensor.

In addition to one or more of the features described herein, or as an alternative, further embodiments include a first region that is a tip region of the measurement device.

In addition to one or more of the features described herein, or as an alternative, further embodiments include a second region that is a heater section of the measurement device.

In addition to one or more of the features described herein, or as an alternative, further embodiments include a status signal or flag that indicates a condition of the tip region of the measurement device.

In addition to one or more of the features described herein, or as an alternative, further embodiments include a status signal or flag that indicates a condition of a heating element in the heater section of the measurement device.

In addition to one or more of the features described herein, or as an alternative, further embodiments include comparing, by the programmable logic and processing system, a temperature of the first region with a temperature of the second region, and triggering an alarm, warning, or message based on the comparison of the temperature of the first region and the temperature of the second region.

In addition to one or more of the features described herein, or as an alternative, further embodiments include a programmable logic and processing system that are configured to compare the condition sensed by the first sensing element with a first threshold value.

In addition to one or more of the features described herein, or as an alternative, further embodiments include a programmable logic and processing system that are configured to compare the condition sensed by the second sensing element with a second threshold value.

Technical effects of embodiments of the present disclosure include an architecture to perform health monitoring of heater used for a measurement device.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIG. 6 depicts a flowchart of a method for operating a health monitoring system in accordance with one or more embodiments.

DETAILED DESCRIPTION

Instrument failures such as those in sensor devices can lead to detrimental outcomes for various systems. Such failures can be caused by icing conditions or other environmental conditions. Icing can obstruct the inlet of the pitot tube or cause the pitot to be completely iced over leading to inaccurate readings or malfunctioning of the sensor device. Because the pitot tube provides airspeed information that may be used by other systems, it is important to ensure reliable measurements are obtained.

Other failures, such as failures due to electrical arcing inside the heater, can cause a short circuit inside the pitot tube and lead to partial heating of the pitot probe. Because the shorted heater can still draw current, this can prevent the aircraft from detecting a failure of the heater. There is no indication of the heating issue of the device. Failures of the heating device can lead to flight cancellations, delays, and diversions due to flight restrictions for the weather.

The techniques described herein monitor the temperature of a tip region and heater section of the pitot tube to determine the proper operation of the heating element of the system. This allows the system to identify if the heater section is operational and further determine if the tip region is at a sufficient temperature to prevent blockages caused by icing conditions. In addition, the temperatures of the different regions can be compared to ensure it is operating within an acceptable range. Responsive to identifying conditions that trend towards a failure of the device or heater, maintenance and service of the device and heater can be scheduled based on current conditions of the heater instead of a strict time-based maintenance schedule.

Figure 1:
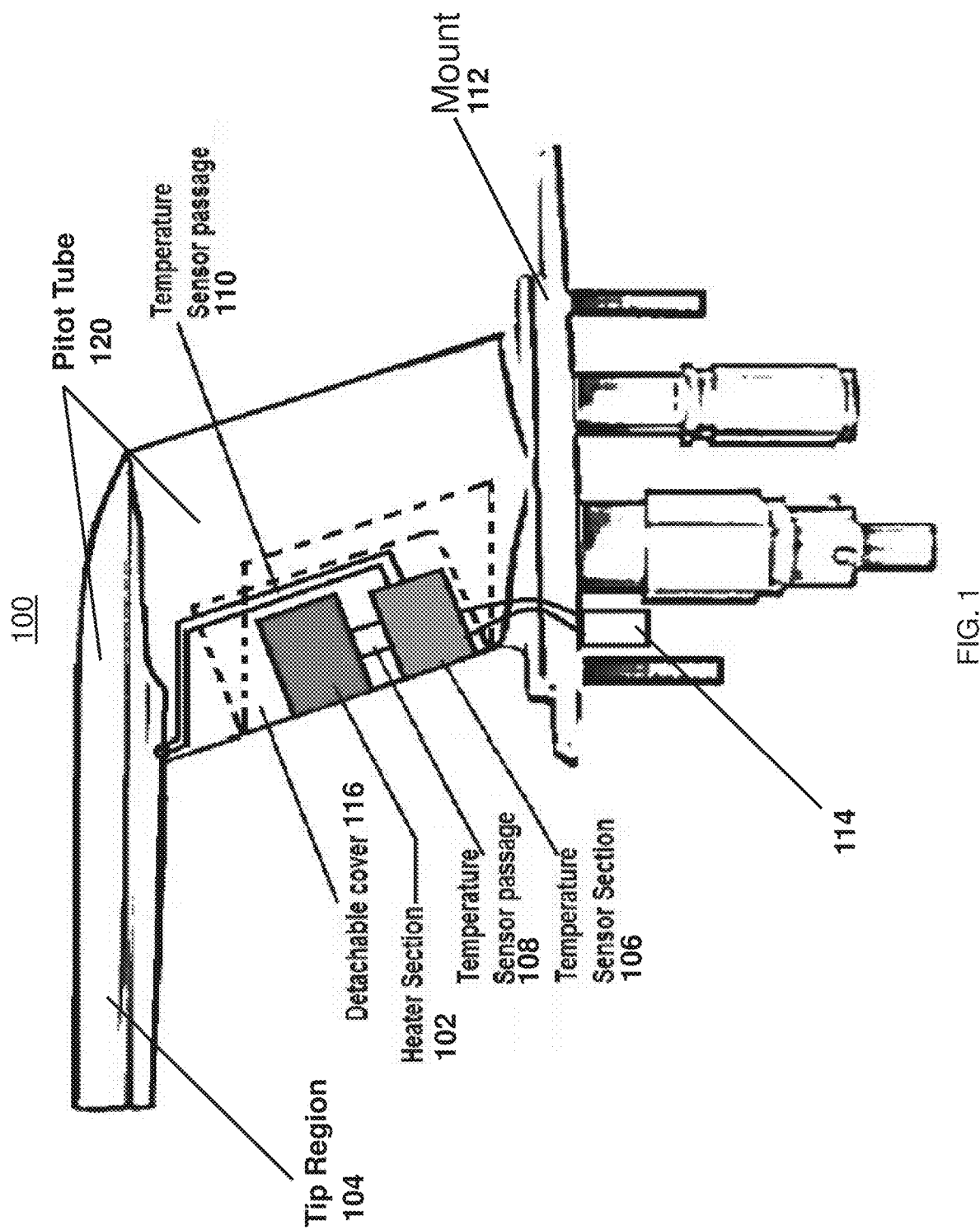
FIG. 1 depicts a pitot tube heater health monitoring system in accordance with one or more embodiments.

Now referring to FIG. 1, a pitot tube heater health monitoring system 100 in accordance with one or more embodiments. The pitot tube 120 (measurement device) as shown in FIG. 1 is a non-limiting example of the type of measurement device and is not intended to limit other types of measurements devices that can be used. The pitot tube 120 includes a heating element in a heater section 102 that is in contact with one or more portions of the pitot tube 120 such as the tip region 104 of the pitot tube 120. The heat can be generated by the heating element of the heater section 102 to de-ice the pitot tube 120 to obtain accurate airflow readings. It should be understood the heating element of the heater section 102 can be any type of heating element. The heating element is coupled to a temperature sensing section 106 by a first temperature sensor passage 108. The temperature sensing section 106 is configured to obtain the reading for the temperature of the heat generated by the heating element. The temperature sensing section 106 is also configured to obtain a temperature reading of the temperature at the tip region 104 of the pitot tube 120. The temperature sensing section 106 is also coupled to the tip region 104 through the second temperature sensor passage 110.

The pitot tube 120 can be mounted using the mount 112 to different types of structures or vehicles such as aircraft. A processing module 114 can also be operably coupled to the temperature sensor section 106 to perform additional processing such as prognostics and diagnostics for the system. Further details of the processing module 114 are discussed below with reference to FIG. 2.

In one or more embodiments, the sensors are positioned at a defined location such that the outer dielectric mirror should make intimate contact with the heating element of the heater section 102 and the tip region 104. The contact can impact the speed at which the sensors temperature sensing section 106 respond to the temperature changes of the monitored heater section 102 and the tip region 104.

In one or more embodiments, the processing module 114 of FIG. 1 is configured to provide various state information for the pitot tube heater health monitoring system 100. By monitoring data from the temperature sensing section 106 the health information of the pitot tube 120 can be determined. For example, the processing module 114 can be configured with separate threshold values for the tip region 104 and the heater section 102. When heat is being generated and the temperature threshold is not reached, the processing module 114 can trigger an alarm condition or warnings/messages. In a different example, the processing module 114 can compare the temperature of the tip region 104 to the temperature of the heater section 102. If the difference between the temperature readings is not within an acceptable configurable threshold range, an alarm or warning/message can be triggered. A detachable cover 116 is incorporated to provide access to the heater section 102 and the temperature sensor section 106.

The techniques described above can provide the ability for the pitot tube heater health monitoring system 100 to specifically identify an issue with the heating element of the heater section 102 generating an expected amount of heating or the tip region 104 receiving an expected amount of heating.

Figure 2:
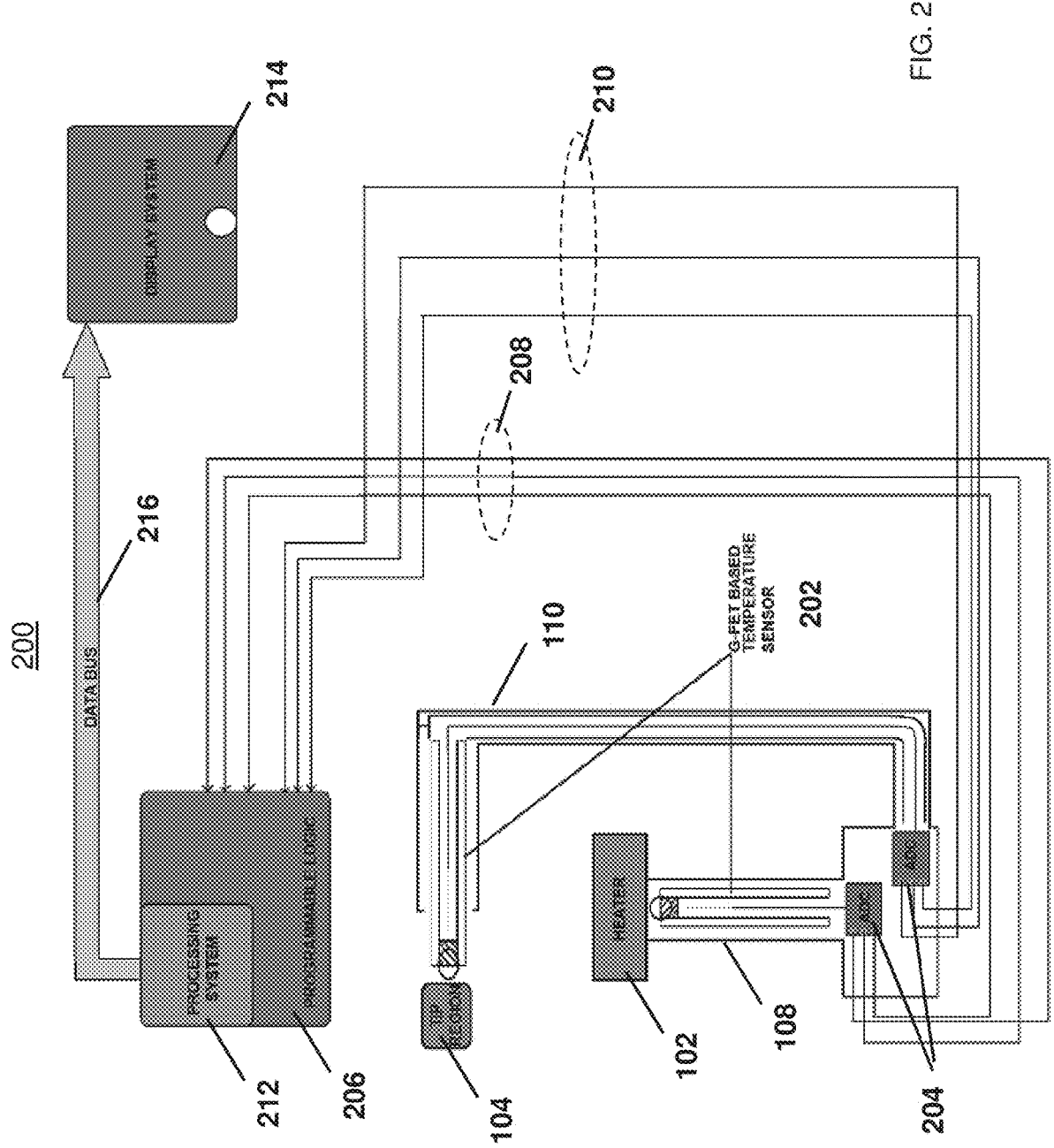
FIG. 2 depicts a health monitoring system in accordance with one or more embodiments.

Referring now to FIG. 2, a system 200 for performing health monitoring of a pitot tube heater is shown. The system 200 includes a first and second sensing element 202. In one or more embodiments, the sensing elements 202 are graphene-based temperature sensors and are positioned in a location to monitor the tip region 104 and the heater section 102 of the pitot tube 120. One of the sensing elements 202 is coupled to a first analog-to-digital converter (ADC) 204 to convert the detected temperature at the tip region 104 to an electrical signal and provide the signal over a first path 210 to a programmable logic block 206 for further processing. Similarly, another sensing element 202 is coupled to a respective ADC 204 and is also configured to convert the detected temperature of the heater section 102 to an electrical signal and provide the signal to the programmable logic block 206 over a second path 208.

The programmable logic 206 and processing system 212 is configured to determine various conditions and states of the pitot tube 120 and provide the information to a display system 214 over a data bus 216. In one or more embodiments, a 3-bit vector can be used to define various conditions and states of the device. Various combinations of bits indicate the status of the system such as device failure, power loss, etc. In addition, the status can indicate that a temperature has fallen below the critical level or exceeded the critical level for the tip region 104, or a temperature has fallen below the critical level or exceeded the critical level for the heater section 102.

In one or more embodiments, the programmable logic 206 which can be an application specific integrated circuit (ASIC) or a field programmable gate array (FPGA) and processing system 212 which can be a microprocessor or a microcontroller can determine various conditions by monitoring the 3-bit vector status signal/flag. The programmable logic monitors the digital signals/pulses coming from the respective ADCs and based on the values of these signals, it determines the status of the heater and in addition, the tip region. This status information gets encoded into a 3-bit vector called status flag/signal and passed onto the processing system, which decodes it and provides the appropriate warning/message or trigger alarm conditions which gets displayed onto the display system via the data bus.

Figure 3:
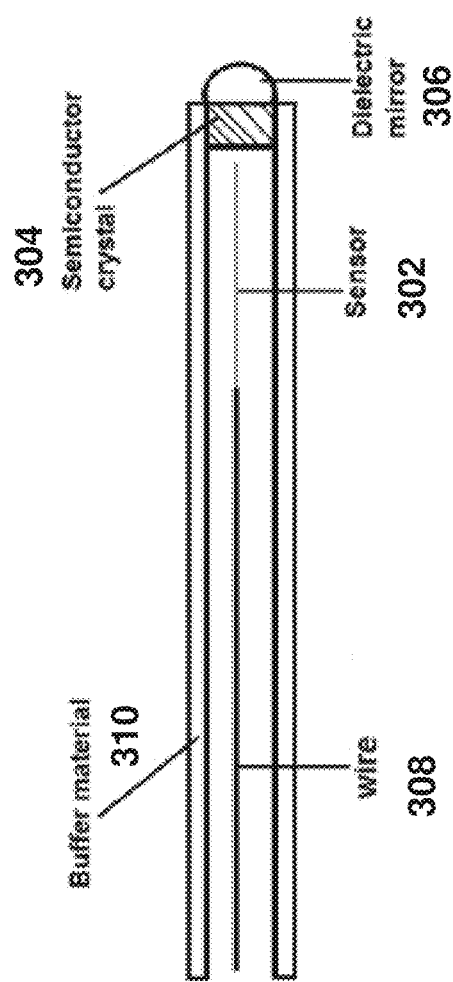
FIG. 3 depicts an arrangement of the sensing element used in the pitot tube heater health monitoring system in accordance with one or more embodiments.

FIG. 3 depicts a sensing element 202 used in a system such as that shown in FIG. 2. The sensing element 202 includes a sensor 302 that is coupled to a semiconductor crystal 304 and dielectric mirror 306. The opposite end of the sensor 302 is coupled to the wire 308. In one or more embodiments, the sensor 302 is enclosed in a buffer material 310 to protect the components of the sensing element 202.

Figure 4:
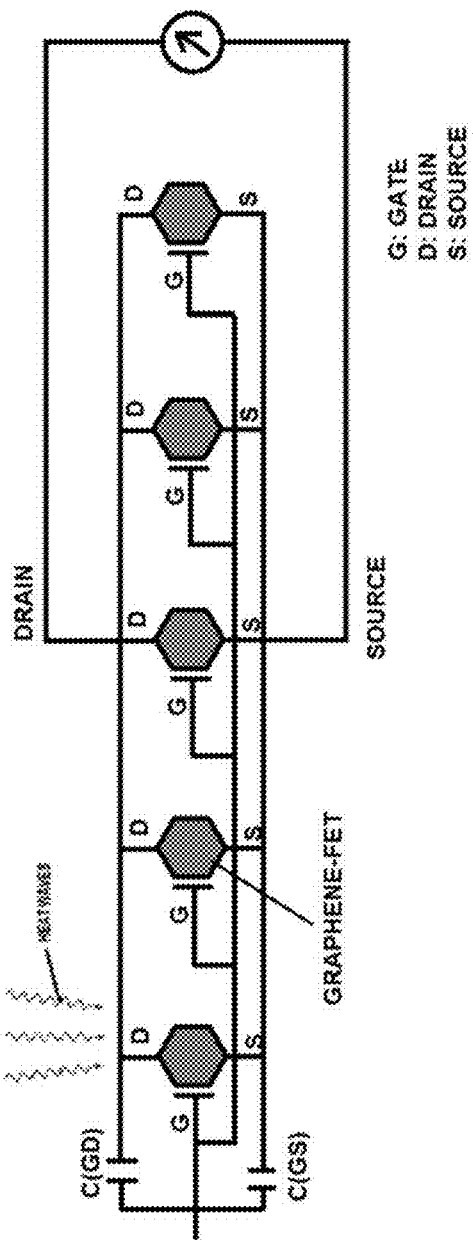
FIG. 4 depicts an arrangement of sensing devices in accordance with one or more embodiments.

FIG. 4 depicts an example arrangement of the sensing devices (i.e., graphene based field effect transistors (G-FETs)) and this arrangement acts as a temperature sensor and it is the sensor in the sensing element 202. In some embodiments, graphene-based field effect transistors (G-FET) are suitable for high-temperature sensing applications since the steady-state resistance of the G-FET sensor is very sensitive to high-temperature variation. The G-FETs of the sensing portion of the sensing element 202 detect heat from a monitored location and provides the signal associated with the detected temperature. The generated current can be determined by the following Equation 1:

$$I_D = \frac{W}{L} q \int_0^L n(x)v(x)dx \quad \text{(Eq. 1)}$$

where W is the width; L is the length; n(x) is carrier density of the graphene and v(x) is carrier drift velocity. Responsive to the temperature changes the carrier density and carrier drift velocity will change and hence the current. The generated electric current will be sensed by the ADC and corresponding digital signal/pulses output will be produced. The electric current will be converted into the digital signal/pulses by the analog-to-digital converter. The programmable logic 206 and processing system 212 will be responsible for monitoring the status signal/flag and hence subsequently provide an indication to the display system 214.

Figure 5:
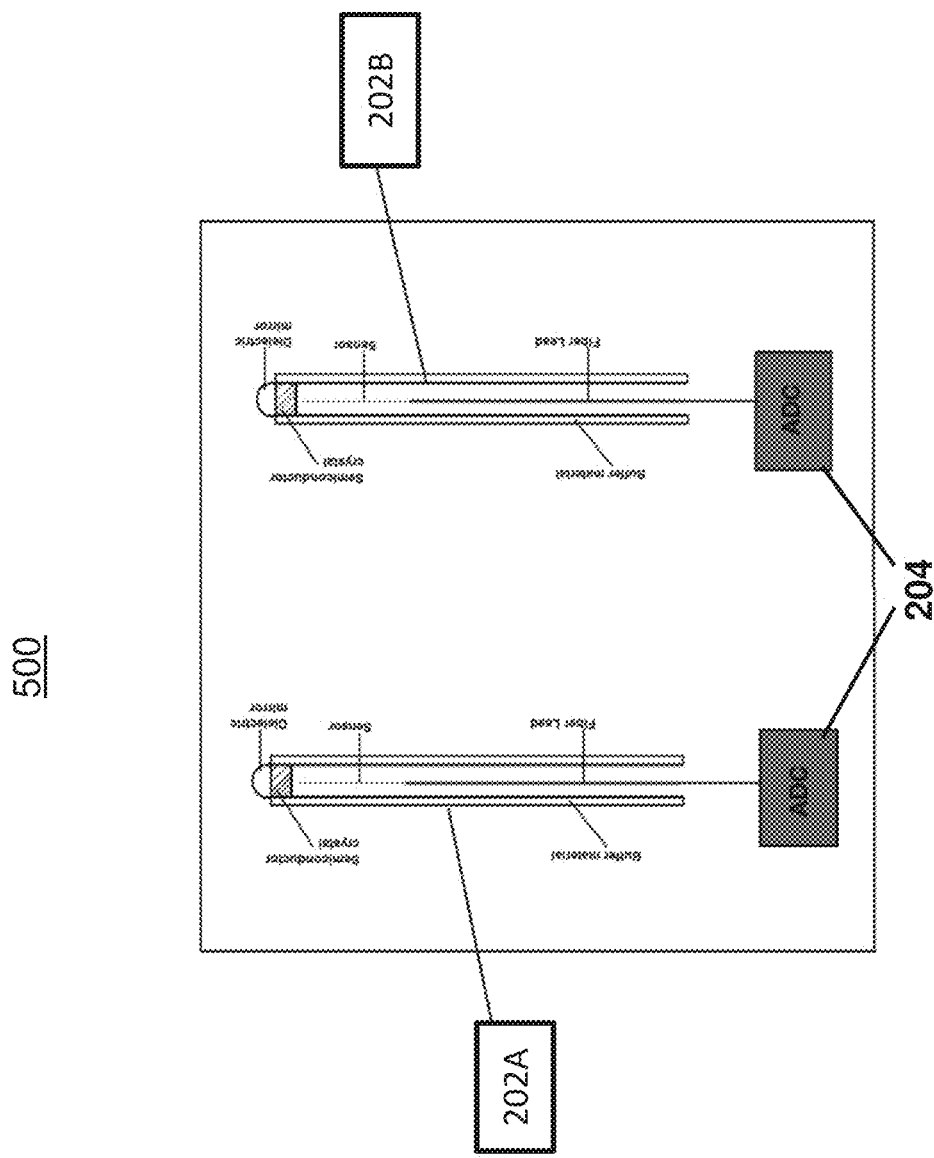
FIG. 5 depicts a dual arrangement of the sensing element used in the pitot tube heater health monitoring system in accordance with one or more embodiments.

Now referring to FIG. 5, a dual arrangement of the sensing elements 202 is shown. A first sensing element 202A configured to monitor a first region and a second sensing element 202B configured to monitor a second region is provided. The sensing elements 202 are coupled to respective ADCs 204 which convert the sensed heat to an electrical signal that is provided to a processor (programmable logic and processing system).

Now referring to FIG. 6, a flowchart of a method 600 for performing health monitoring for the heater of a pitot tube in accordance with one or more embodiments is shown. The method 600 begins at block 602 and proceeds to block 604 which provides for monitoring a heating element to control heating of a measurement device. The heating element can be controlled to ensure the icing of the measurement device does not inhibit the measurement device from obtaining reliable measurements. That is, the heating element can be controlled to automatically or manually switch ON/OFF based on the sensed conditions of the heating element. At block 606, the method 600 senses a condition of a first region of the measurement device and at block 608, the method 600 senses a condition of a second region of the measurement device. In one or more embodiments, the sensing is performed by a G-FET based temperature sensor. The first region can be a tip region of the measurement device such as a pitot tube. The second region can be a heater section that is controlled to prevent icing of the measurement device. Block 610 generates a status signal/flag based at least in part on conditions of the first or second region of the measurement device. In some embodiments, the status information is displayed on a display of a device as shown in block 612. In one example, both the state information for the tip region and the heater section can be displayed individually so that an indication can be provided for the condition at the tip region and the heater section. The method 600 ends at block 614. It should be understood that the steps of the method 600 are not intended to be limiting and other steps and sequence of steps can be performed.

The techniques described herein allow operators to implement a condition-based maintenance program instead of a strict time-based maintenance program. In addition, the pitot tube is able to be monitored region-wise and not simply as a single device. That is, an indication can be provided for an issue with the heater section or the tip region which can be continuously monitored via the status signal/flag.

The techniques described herein obviate the need for a dual heater solution which increases the complexity and space required. Adding a second heater would require significant additional optimization of the thermal behavior of the probe. Adding another heater would require several more components to notify crew/maintenance crews if a failure has occurred, and switch to the other heater element. The two G-FET based temperature sensors, programmable logic and processing system used in the techniques that are described herein can be integrated with on-board programmable logic and processing systems. There is no need to include two sensing circuits (voltage sensing and current sensing circuits) followed by signal processing circuit. A viable technique is described herein to detect pending heater failures for the measurement device.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for performing health monitoring of a pitot tube system, the method comprising:
    monitoring a heating of a pitot tube, the heating element configured to control heating of the pitot tube to de-ice the pitot tube;
    sensing, by a first sensing element operably coupled to the pitot tube, a temperature of the pitot tube;
    sensing, by a second sensing element operably coupled to the heating element, a temperature of the heating element; and
    generating, by a programmable logic and processing system, a status signal or flag based at least in part on the temperatures of the pitot tube or the heating element.

2. The method of claim 1, wherein the first sensing element and the second sensing element are graphene field effect transistors based temperature sensor.

3. The method of claim 1, wherein the first sensing element senses a temperature of a tip region of the pitot tube.

4. The method of claim 3, wherein the status signal or flag indicates the temperature of the tip region of the pitot tube.

5. The method of claim 1, wherein the status signal or flag indicates the temperature of the heating element.

6. The method of claim 1, further comprising comparing, by the programmable logic and processing system, a temperature of the pitot tube with a temperature of the heating element; and triggering, by the programmable logic and processing system, an alarm, warning, or message based on the comparison of the temperature of the pitot tube and the temperature of the heating element.

7. The method of claim 1, wherein the programmable logic and processing system are configured to compare the temperature sensed by the first sensing element with a first threshold value.

8. The method of claim 1, wherein the programmable logic and processing system are configured to compare the temperature sensed by the second sensing element with a second threshold value.

* * * * *